United States Patent [19]

Tworek et al.

[11] 4,309,244
[45] Jan. 5, 1982

[54] PROCESS FOR MANUFACTURING BORON NITRIDE FIBER MATS

[75] Inventors: John L. Tworek, West Seneca; Gordon R. Rignel, Clockport, both of N.Y.

[73] Assignee: Kennecott Corporation, Stamford, Conn.

[21] Appl. No.: 134,765

[22] Filed: Mar. 28, 1980

[51] Int. Cl.³ .......................... D21H 5/18; D21H 5/26
[52] U.S. Cl. .......................................... 162/102; 65/6; 162/152; 162/157 R; 162/181 R; 162/201; 162/206; 162/207
[58] Field of Search .................... 162/152, 157 R, 102, 162/201, 206, 207; 423/290; 428/366; 264/319, 332, 65, 8; 106/55; 65/6-8, 2, 4 R, 9, 32, 30 R

[56] References Cited

U.S. PATENT DOCUMENTS

| | | | |
|---|---|---|---|
| 2,888,325 | 5/1959 | Taylor | 423/290 |
| 3,429,722 | 2/1969 | Economy et al. | 106/5 S |
| 3,816,242 | 6/1974 | Selover et al. | 162/157 R |
| 3,837,997 | 9/1974 | Economy et al. | 428/366 |
| 4,075,276 | 2/1978 | Economy | 264/332 |
| 4,125,450 | 11/1978 | DeGueldre et al. | 204/296 |
| 4,130,631 | 12/1978 | Hamilton | 423/290 |

*Primary Examiner*—Peter Chin
*Attorney, Agent, or Firm*—John L. Sniado; Anthony M. Lorusso

[57] ABSTRACT

A process is disclosed for producing a non-woven, boron nitride-bonded boron nitride fiber mat, suitable for use as an electric cell separator in a lithium-sulfide battery. Molten boron oxide is centrifugally spun into strands and attenuated by an annular gas stream into fibers which are compacted at a controlled relative humidity into a bundle and heated in an anhydrous ammonia atmosphere to convert boron oxide in the fibers to boron nitride (BN). The BN fibers are blended with a lesser amount of boron oxide fibers and a nonaqueous liquid medium to form a slurry. The slurry is processed through a Fourdrinier machine to form a felt; and, the felt is calendered by passing it through the nip of a pair of calender rolls at an appropriate temperature and pressure to soften the boron oxide binder to fuse the BN fibers together. The interstitial boron oxide then is converted to boron nitride.

19 Claims, 4 Drawing Figures

PROCESS FOR MANUFACTURING BORON NITRIDE FIBER MATS

BACKGROUND OF THE INVENTION

The invention relates generally to boron nitride fibers and more particularly to a process for producing integral boron nitride fiber mats.

Boron nitride (BN) possesses a number of highly desirable properties which render it useful in a wide variety of applications. Its high electrical resistivity, coupled with its high thermal conductivity, make it especially useful in electrical and electronic applications requiring a material which simultaneously acts as an electrical insulator and a thermal conductor. Its excellent thermal shock resistance renders it effective as a refractory at temperatures up to 1600° C. or higher in a non-oxidizing atmosphere and at temperatures as high as 700° to 900° C. in air. It is highly corrosion resistant, being inert to most organic liquids and many corrosive chemicals and displaying excellent resistance to attack by various molten metals. Furthermore, because of its low dissipation factor over a wide temperature range, this material is well suited for use in microwave and radar dielectric components (radar windows).

Various methods for the manufacture of boron nitride fibers are known in the prior art; for example, it is disclosed in U.S. Pat. No. 3,429,722, issued to James Economy et al., that boron nitride fibers can be manufactured by heating boron oxide fibers in an ammonia atmosphere, a process known generally as nitriding.

While it is well known in the prior art that boron nitride fibers can be manufactured having good characteristics, the use of such fibers has been limited due to difficulties in forming three dimensional articles from the fibers. U.S. Pat. No. 3,816,242 to Selover et al. teaches a process for binding BN fibers into a felt using an aqueous solution of an inorganic, water soluble material as the binder. However, almost any substance other than BN which is used to bond the fibers to each other has properties which are inferior to the properties of the boron nitride fibers, thus resulting in a bonded article which is unsuitable for use in many applications. For example, when a boron nitride fiber mat, which is bound by prior art materials, is used as an electric cell separator in a lithium sulfide battery utilizing a corrosive cell electrolyte, such as molten lithium chloride or potassium chloride, the fibers separate from each other due to the inability of the binding material to withstand the high temperature corrosive environment.

An attempt has been made prior to the present invention to form articles from boron nitride-bonded boron nitride fibers, for example, by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually non-porous, bodies have also been prepared in the past. Such articles are disclosed, for example, by Taylor, U.S. Pat. No. 2,888,325, which teaches the use of a multiple stage nitriding process comprising intermittent addition of oxygen-containing boron compound at intermediate stages of nitriding, followed by further nitriding.

U.S. Pat. No. 4,125,450 suggests that battery separators may be manufactured using conventional papermaking techniques. However, the adaptation of a Fourdrinier paper machine, or other papermaking apparatus, to the processing of boron nitride fibers, so as to yield an acceptable finished sheet appears to be unknown to the prior art.

U.S. Pat. No. 4,130,631, assigned to the same assignee as the present application, does disclose a method for producing a non-woven porous boron nitride fiber mat having sufficient strength for use as an electric cell separator in the above mentioned molten lithium chloride environment. However, despite the superior physical characteristics of the resulting product, this method is not sufficiently detailed to insure an economically feasible operation.

Therefore, it is an object of the present invention to provide a totally integrated manufacturing process to produce boron nitride fiber mats starting from the basic boron oxide, and to do so in a commercially feasible manner.

It is a further object of the present invention to adapt techniques from the papermaking and fiberglass producing arts to the economical production of boron nitride articles.

SUMMARY OF THE INVENTION

A process for producing a non-woven, boron nitride-bonded boron nitride fiber mat, suitable for use as an electric cell separator in a lithium-sulfide battery, comprises the steps of centrifugally spinning molten boron oxide into strands and attenuating the strands with a gas stream into fibers, compacting the fibers into a bundle and heating them in an anhydrous ammonia atmosphere at a sufficient temperature and for a sufficient time to convert the fibers into boron nitride (BN). The boron nitride fibers are blended with a lesser amount of boron oxide fibers and a nondissolving, anhydrous liquid medium to form a slurry. The slurry is processed through a Fourdrinier machine into a felt, which is passed through the nip of a pair of calendar rolls, at least one of which rolls is heated to calendered temperature sufficient to soften the boron oxide binder to fuse the BN fibers together. Then the interstitial boron oxide is converted into boron nitride.

In a preferred embodiment, staple boron nitride fibers having lengths of from 0.01 inch to 1.0 foot are blended with boron oxide fibers in the ratio of 50–99% by weight of boron nitride and 1–50% by weight of boron oxide, using a Freon (a Trademark of E.I. duPont de Nemours and Company) liquid as the suspending medium.

However, other percentage ratios of the fibers can be used as the situation dictates, and it is even possible to process 100% boron oxide fibers through the blending and subsequent steps and still achieve a satisfactory end product. Alternative liquid mediums such as propanol, kerosene or benzene can be used as the situations dictate.

BRIEF DESCRIPTION OF THE DRAWINGS

The several features and advantages of this process for manufacturing boron nitride felt mats in accordance with the invention, will be more readily understood and appreciated from the following detailed description of the preferred embodiments, as shown in the accompanying drawings in which.

DESCRIPTION OF THE PREFERRED EMBODIMENT

Figure 1:
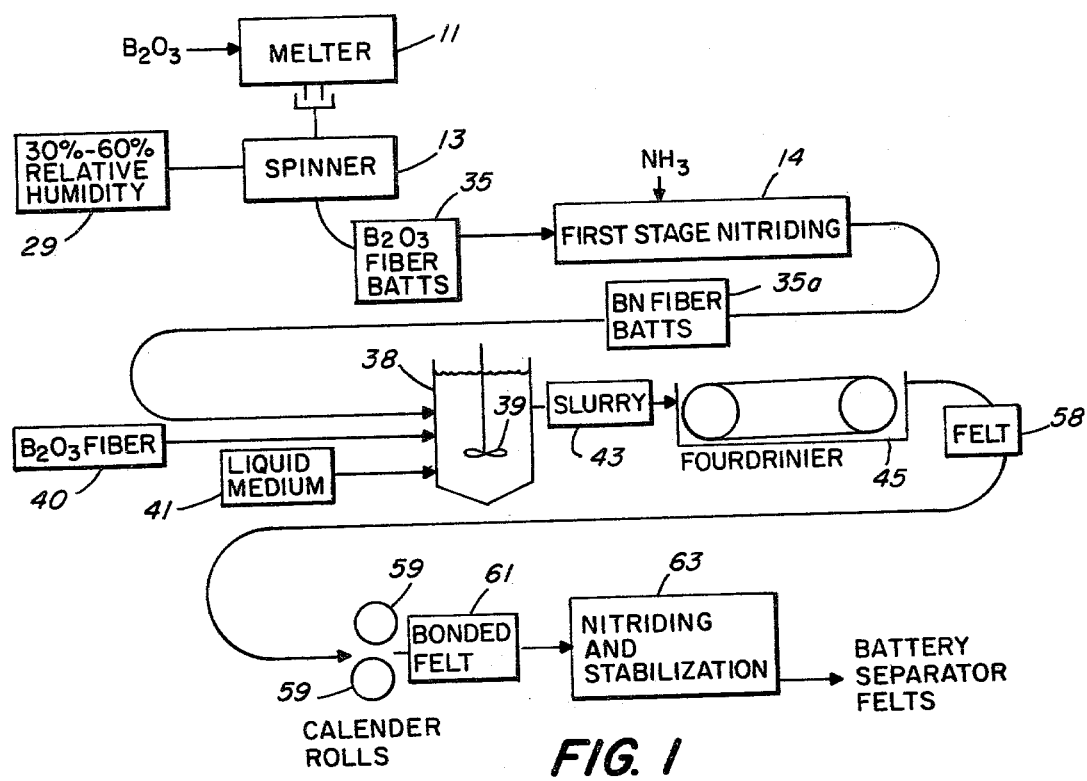
FIG. 1 is a flow diagram of the boron nitride manufacturing process.
Figure 2:
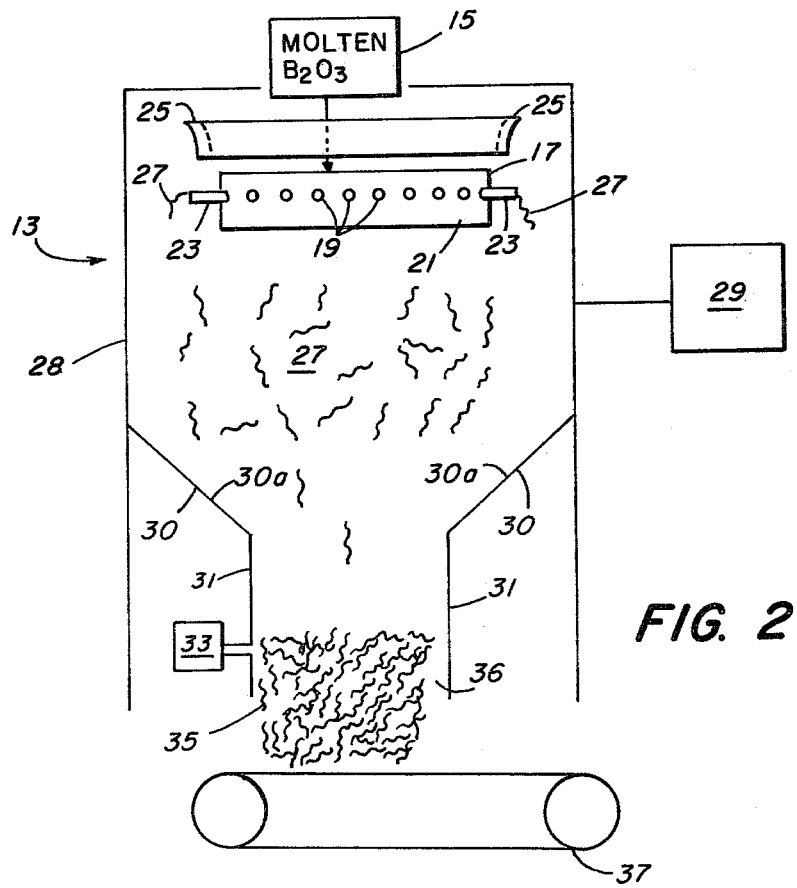
FIG. 2 is a side elevation view, in a diagrammatic form of the boron oxide centrifugal spinning apparatus used to produce boron oxide fibers.

Referring now to FIG. 1, the starting point in the boron nitride manufacturing process, is the production of the basic boron oxide fibers utilizing a melter 11 and a spinner apparatus 13. The melter, as its name indicates, raises the temperature of solid boron oxide ($B_2O_3$) crystals above their 460° C. melting point, using any convenient means, and turns them into a molten liquid. The melter generally heats the $B_2O_3$ crystals to a temperature in the range of 600°–1100° C. Referring now to FIG. 2, the molten boron oxide liquid 15 is introduced into a cylindrical drum 17 having a series of orifices 19 arranged at generally equal spacings about the circumference of a vertically extending sidewall 21. A drive motor (not shown) spins the drum containing the molten boron oxide at a high speed (1000-3000 RPM), thereby forcing the molten boron oxide centrifugally outward against the inner surface of the sidewall 21 and through the orifices 19. This action produces a series of extruded strands or primary elements 23. An annular orifice 25 with a diameter one inch greater than the drum 17 diameter is disposed about the periphery of the rotating drum 17, generally perpendicular to the direction of extrusion of the strands. A stream of gas, for example, an inert gas, compressed air or combustion gases, emanates from the orifice 25 at a temperature in excess of about 700° C. and at a rate of approximately 800 to 900 feet per second, and impinges obliquely on the outward end of the opposing strand 23. The action of the gas stream induces a downward velocity and an attenuating effect, which thins each of the strands into a fiber or filament 27. This procedure is analogous to processes known in the fiber glass manufacturing art, using apparatus such as those disclosed in U.S. Pat. Nos. 3,014,236 and 3,030,659. Although the proper combination of operating variables such as, for example, rotational speed of the drum and the temperature and rate of gas flow from the annular orifice 25 could produce one continuous boron oxide fiber 27 from each of the strands 23, because of the inherent brittleness of the boron oxide the stream typically produces staple or discretely formed fibers, generally ranging from about 0.1 inch to 1.0 foot in length. Preferably the maximum diameter of the fibers is targeted to about 10 microns, with 3-7 microns being the optimum diameter range.

An outer housing 28 of the spinner creates a more or less isolated environment in which the extruding and attenuating operations take place. A humidity controller 29 maintains this environment at a relative humidity of about 30-70%, an amount which does not significantly deteriorate the water-soluble boron oxide.

The mass of spun-off fibers 27 falls into the space encompassed by a receptacle 30 whose sloping sides 30a gradually funnel the mass into a chamber 31. An air transvector 33 communicates with the interior of the chamber 31. This transvector provides a high velocity (100-200 feet per second) stream of air which prevents the fibers from wrapping together to form a "rope". The stream of air creates a turbulence which violently swirls and intertwines the fibers, producing multiple collisions and points of contact thereamong, resulting in random fiber orientation and an even distribution of the fibers on a collecting screen 37. The density of the compacted fiber mass or batt 35 as it exits from a discharge port 36 of the spinner, is typically in the range of from about 0.001 to 0.004 grams per cubic centimeter. The moving collecting screen 37, positioned beneath the discharge port 36, receives the batts. Alternatively, the batt may fall onto a continuously moving conveyor belt or into a collecting bin. In either case, the function of the screen, the conveyor belt, or the bin is to allow the batts to be transported to the location of the next step in the process.

Referring again to FIG. 1, the next step in the process in accordance with the present invention, is the nitriding of the boron oxide fiber batts to convert the fibers into boron nitride, indicated in FIG. 1 by the reference numeral 14.

The nitriding phase involves the heating of the batt of boron oxide fibers in an ammonia ($NH_3$) atmosphere, which is free of water vapor, because of the deteriorating effect of water on boron oxide. This exposure of the boron oxide to the ammonia atmosphere produces a reaction according to the general equation: $B_2O_3 + 2NH_3 \rightarrow 2BN + 3H_2O$. As disclosed in more detail in U.S. Pat. No. 3,429,722 to Economy et al. (having a common assignee as the present application, and which is incorporated here by reference), the temperature of the boron oxide is raised from room temperature to a final temperature between about 700° to 1100° C. at a rate of from 5° to 100° C. per hour. The flow of ammonia through the reaction chamber is maintained at 0.01 to 3.3 liter/min/gram of $B_2O_3$ fiber being reacted. Nitriding time may range between 10 hours and 100 hours. As the temperature increases, two intermediate stages of reaction occur. The first reaction which occurs is that of adding a protective shield of a nitrogen and hydrogen containing composition to the outer surface of the $B_2O_3$ fiber. This shield not only retains the fibrous form, but also prevents fusing of the fibers together. Such addition reaction extends from room temperature up to about 250°–300° C. Above about 300° C. and up to about 500° C. the $B_2O_3$ fiber, if having a maximum diameter of not more than about 10 microns, develops a highly porous structure, accompanied by a weight loss and the giving off of water vapor according to the aforesaid general equation. Thus, the $NH_3$ is able to penetrate substantially throughout the thickness of the $B_2O_3$ fiber, allowing the boron, nitrogen, hydrogen and oxygen to react, and begin the formation of various intermediate boron and nitrogen containing compositions. The exact method by which the nitriding is effected is not critical to the present invention, and various alternative methods previously known in the art may yield equally satisfactory results for the present process.

Although in the preferred embodiment the nitriding phase converts essentially all of the boron oxide into boron nitride, the process according to the present invention is still feasible if only partial nitriding occurs at this point in time, and the remainder of the conversion occurs later, as hereinafter described. Nevertheless, once the fibers have been converted either totally or partially into boron nitride, the fiber batts are ready for the next step in the process.

Referring again to FIG. 1, the totally or partially nitrided fiber batts 35a are introduced into a blending apparatus 38 in which an agitating member 39 blends them with a smaller amount of pure boron oxide fibers 40, preferably in a ratio of 50–99% by weight of BN fibers and 1–50% by weight of $B_2O_3$ fibers and a nonaqueous liquid medium 41 to produce a homogeneous suspension of the fibers within the fluid, commonly known as a slurry. The medium 41 used is one which does not have a dissolving effect on either of the fibers, and in which there are no traces of water. Fluids such as, for example, kerosene, propanol, benzene and various liquid fluorocarbons known by the broad term Freon (a trademark of the E. I. duPont de Nemours Company) may be used as the medium. Freon TF ($CCl_2F$—$CClF_2$) has been proven to be the preferred liquid for this operation. Typically, after blending, the percentage of solids suspended within the Freon medium is in the range of from 0.01% to 1.0% by weight.

Figure 3:
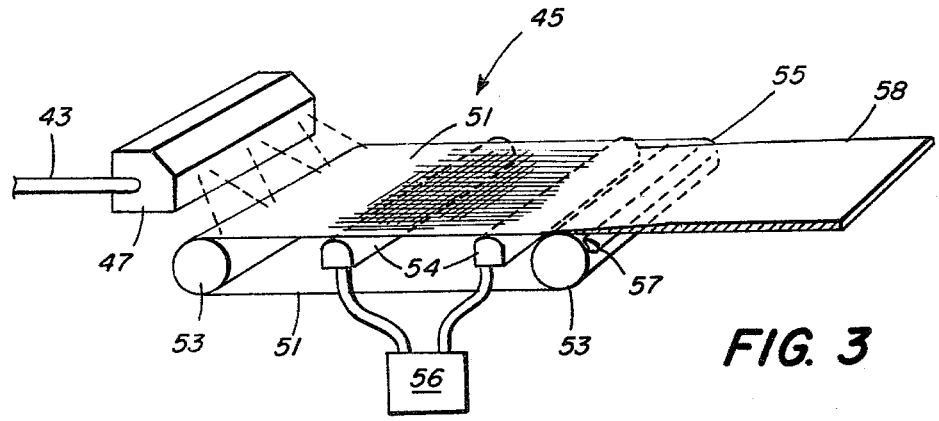
FIG. 3 is a side perspective view, in a diagrammatic form, of the Fourdrinier machine used to produce the boron nitride felt.

A pipeline or conduit 43 conveys the slurry to a Fourdrinier machine 45, an apparatus well known in the papermaking art. Referring now to FIG. 3, the pipeline 43 delivers the slurry to a headbox 47 of the Fourdrinier machine 45. The headbox 47 has the same width as screen 51 so that the slurry flows onto the continuous screen 51 in a uniformly thick layer. The screen is supported and driven in an endless loop by rollers 53, which are driven by an external source (not shown). For best results the speed of the screen should be in the range of from 1.0 to 100 feet per minute.

The flow rate of the slurry within the headbox (controlled by a variable speed pump, not shown) must be adjusted, depending on such factors as, for example, the concentration of the fibers within the slurry, the depth of the slurry, and the speed of the screen, to insure that the fibers are traveling at about the same speed as the screen at the point of impact thereon. This allows a portion of the fibers within the slurry to orient themselves in a direction transverse to the movement of the screen, to enhance the tensile strength of the resultant fiber mat in this direction. Too great a differential between the speeds of the fibers and the speed of the screen causes all the fibers to align themselves in the direction of the screen movement, resulting in a reduction in transverse tensile strength.

Located beneath the porous screen 51 are a succession of vacuum boxes 54 whose function is to draw the liquid (Freon) carrier from the slurry to reduce its liquid content. By the time the slurry has reached the right-hand or forward-most end 55 of the screen, the percentage of solids within the slurry has increased from the initial 0.01% to 1.0% to a final value of about 100%. As the fluid content decreases, fiber to fiber contact increases. What remains is a homogeneous mat of intertwined boron nitride fibers with interstitially located boron oxide fibers. Thus, the slurry gradually and successively dries into an internally cohesive felt.

The amount of suction provided by the vacuum boxes generally is about −1.0 atmosphere, and six such vacuum boxes typically are needed for adequate drying. A heating element of some type may be used in conjunction with the vacuum boxes to improve drying of the slurry through evaporation. However, if evaporation is used as an adjunct, an adequate recovery system must be used to prevent needless waste of the liquid, especially with a fluid as expensive as Freon. Each of the vacuum boxes 54 delivers its recovered liquid to a central reservoir 56, so the liquid can be reused.

Figure 4:
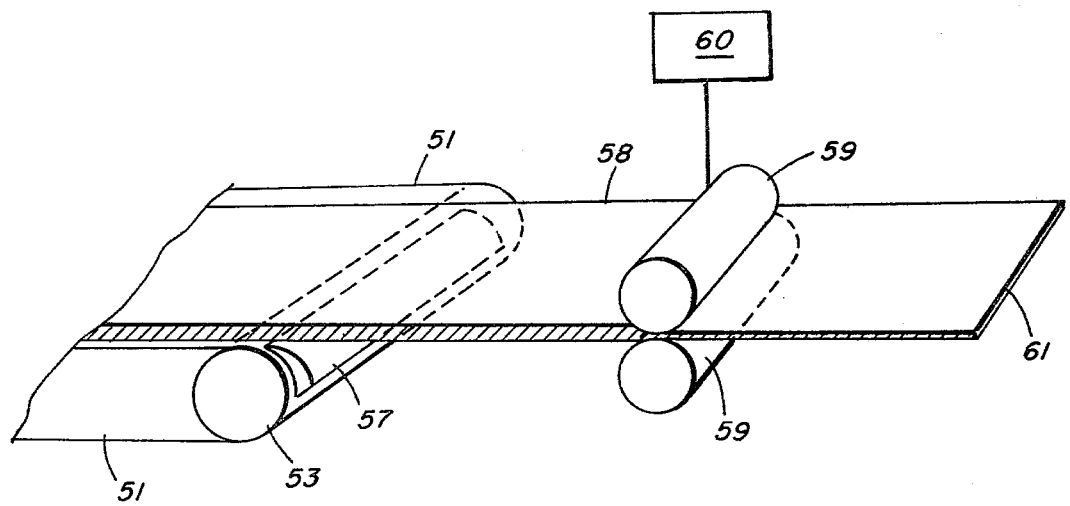
FIG. 4 is a side perspective view, in a diagrammatic form, of the hot calendar rolls system for bonding the felt.

The next step in the process of the present invention is to make an integral and fully bonded felt from the felt which emerges from the Fourdrinier machine screen. As is shown in FIG. 4, a transition plate 57 peels the "dried" felt 58 from the screen, and the felt passes between the nip of a cooperating pair of calender rolls 59. At least one of the calender rolls is heated, for example, by steam supplied to its hollow interior or by electrical resistance elements, to a temperature sufficient to soften the interstitial boron oxide fibers. The temperature may be raised even to a level above the 460° C. melting point of the boron oxide; roll temperatures from about 200° C. to 900° C. are preferred. The calender rolls are fixed at a constant gap across the width of the felt and exert a pressure of from 1–100 lbs. per square inch, to soften the boron oxide uniformly throughout the felt, within the interstices of the boron nitride fibers, to fuse the boron nitride fibers together into a strongly cohesive structure. An adjustment 60 effects changes in the separation between the two rolls, to control the thickness, or loft, of the felt. What emerges from the nip of the calender rolls is a boron oxide-bonded boron nitride fiber mat 61.

The final step in the present process, as indicated in FIG. 1 at 63, is the nitriding and stabilization of the bonded felt to convert the interstitial boron oxide binder material into boron nitride. This step is similar to the initial nitriding stage, in that the material is heated to a final temperature while being exposed to an anhydrous ammonia atmosphere. The temperature and the time duration of this final nitriding and stabilization phase varies depending on, for example, the ratio of nitrided to non-nitrided fibers.

In the case of the preferred embodiment, using a slurry containing 50–99% (by weight) of fully nitrided boron nitride fiber with 1–50% (by weight) of boron oxide fibers, the bonded felt is heated at a final nitriding temperature from about 200° C. to 900° C. for about 2 to 72 hours to yield the desired physical properties. The flow of $NH_3$ through the reaction chamber is maintained at 0.01 to 3.3 liter/min/gram of $B_2O_3$ fiber in the mat. For stabilization purposes, and to enhance the corrosion resistance of the finished mat, as disclosed more fully in the above referenced '722 patent, the fully nitrided mat can be heated in an inert atmosphere at a temperature which may be below, but which is usually above, the final nitriding temperature. Upon completion of stabilization, the nitride-bonded felt can be cut into shapes and sizes appropriate for the applications in which they will be used, for example, as battery cell separator felts in lithium sulfide batteries.

As noted above, although in the preferred embodiment the boron oxide batts are fully nitrided before being blended with additional boron oxide binder into a slurry, the batts alternatively could be only partially nitrided, and the remaining nitride conversion could occur later in the process. Specifically, the final nitriding and stabilization step 63 can be used to effect this remaining nitride conversion, with the operating temperatures and time durations being adjusted accordingly. With this in mind, the present process can be practiced using the following types of fibers within the slurry: fully nitrided boron nitride fibers and boron oxide fibers; partially nitrided boron nitride fibers and boron oxide fibers; 100% boron oxide fibers; combinations of all the above with or without fillers.

A particularly useful form of boron nitride mat can be produced by using a slurry which has a combination of boron nitride fibers, boron oxide fibers and high strength, high modulus of elasticity boron nitride fibers. The high modulus fibers are produced by subjecting partially nitrided boron nitride fibers to longitudinal tension while they are undergoing final conversion to a totally nitrided stage. The production of such high modulus fibers is disclosed in greater detail in U.S. Pat. No. 3,668,059. The introduction of the high modulus fibers produce a felt with greater tensile strength than a felt containing 100% low modulus fibers. The preferred composition of such a felt is about 98% boron nitride and 2% high modulus boron nitride.

The heated calender rolls 50 also can be used to bond together a pure boron oxide fiber bundle, for example, the boron oxide fiber batts 35 (see FIG. 1) produced by the spinning apparatus 13 as described above. In such a case, the heat and pressure applied by the rolls will soften and evenly distribute all the component fibers, to multiply the number of fiber-to-fiber bonds within the batt to improve its cohesiveness, increase its density and produce the mat-like shape. Then the totally fused boron oxide mat can be nitrided all at once to produce a finished boron nitride mat.

Although the foregoing disclosure illustrates the advantages and features of the novel manufacturing process in accordance with the present invention, it may be obvious to those skilled in the art to effect various modifications or changes to the present invention, without departing from the spirit thereof. The scope of the present invention is to be determined by the following claims.

We claim:

1. A process for producing a non-woven, boron nitride fiber mat, comprising the steps of:
   centrifugally spinning molten boron oxide into strands;
   attenuating said strands with a gas stream into fibers;
   collecting said fibers into a bundle;
   heating said fiber bundle in an anhydrous ammonia atmosphere at a sufficient temperature and for a sufficient time to convert boron oxide in the fibers to boron nitride;
   blending said boron nitride fibers with boron oxide fibers and a nonaqueous liquid medium to form a slurry;
   processing said slurry through a Fourdrinier machine to form a felt;
   passing said felt through the nip of a pair of cooperating calender rolls, at least one of which is heated to a temperature sufficient to soften said boron oxide fibers to bond the boron nitride fibers together; and
   heating said bonded felt in an anhydrous ammonia atmosphere at a sufficient temperature and for a sufficient time to convert boron oxide in the felt to boron nitride.

2. The process as set forth in claim 1, wherein said blending occurs with a ratio by weight of about 50–99% boron nitride fibers and about 1–50% of boron oxide fibers.

3. The process as set forth in claim 1, wherein said boron nitride fibers have a length of from about 0.01 inch to about 1.0 foot.

4. The process as set forth in claim 1, wherein said non-aqueous liquid medium is Freon TF.

5. The process as set forth in claim 1, wherein said non-aqueous liquid medium is propanol.

6. The process as set forth in claim 1, wherein said non-aqueous liquid medium is kerosene.

7. The process as set forth in claim 1, wherein said non-aqueous liquid medium is benzene.

8. The process as set forth in claim 3, wherein the percentage of total suspended solid fibers within said slurry is 0.01% to 1.0% by weight.

9. The process as set forth in claim 3, wherein the percentage of total suspended solid fibers within the finished web is about 100%.

10. The process as set forth in claim 1 wherein said step of processing further comprises the step of evaporating a portion of said liquid medium simultaneously with suctioning to more efficiently remove said liquid medium from the slurry.

11. The process as set forth in claim 1, further comprising the step of heating the bonded felt in an inert atmosphere at a temperature above the final nitriding temperature, to enhance the corrosion resistance of the boron nitride felt.

12. The process as set forth in claim 11, wherein said sufficient temperature to convert the boron oxide to boron nitride is from about 200° C. to about 900° C., and said sufficient time to convert the boron oxide to boron nitride is from about 2 to about 72 hours.

13. The process as set forth in claim 1, wherein said at least one of said calender rolls is heated to a temperature in the range of from 200° to 900° C.

14. The process as set forth in claim 1, wherein said gas stream is a stream of compressed air.

15. The process as set forth in claim 1, wherein said gas stream is a stream of combustion gases.

16. The process as set forth in claim 1, wherein said gas stream is a stream of an inert gas.

17. The process as set forth in claim 1, wherein said gas stream has a speed of from about 800 to about 900 feet per second.

18. The process as set forth in claim 1, wherein said drum is spinning at about 1,000 to 3,000 RPM.

19. The process as set forth in claim 1, wherein said Fourdrinier machine operates at a speed of from 1.0 to 100 feet per minute.

* * * * *